US012772258B2

(12) United States Patent
Matsumura et al.

(10) Patent No.: US 12,772,258 B2
(45) Date of Patent: Oct. 20, 2026

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Satoshi Nagata, Tokyo (JP); Weiqi Sun, Beijing (CN); Jing Wang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 311 days.

(21) Appl. No.: 18/559,432

(22) PCT Filed: May 11, 2021

(86) PCT No.: PCT/JP2021/017885

§ 371 (c)(1),
(2) Date: Nov. 7, 2023

(87) PCT Pub. No.: WO2022/239111

PCT Pub. Date: Nov. 17, 2022

(65) Prior Publication Data

US 2024/0244634 A1 Jul. 18, 2024

(51) Int. Cl.
*H04W 72/232* (2023.01)
*H04L 5/00* (2006.01)
*H04W 72/1268* (2023.01)

(52) U.S. Cl.
CPC ......... *H04W 72/232* (2023.01); *H04L 5/0051* (2013.01); *H04W 72/1268* (2013.01)

(58) Field of Classification Search
None
See application file for complete search history.

(56) References Cited

U.S. PATENT DOCUMENTS

| | | | | |
|---|---|---|---|---|
| 2022/0217644 | A1* | 7/2022 | Kung | H04W 52/365 |
| 2022/0225247 | A1* | 7/2022 | Huang | H04W 52/10 |
| 2023/0029850 | A1* | 2/2023 | Park | H04W 72/1268 |
| 2023/0262608 | A1* | 8/2023 | Gao | H04W 52/08<br>455/522 |
| 2023/0319840 | A1* | 10/2023 | Zhang | H04W 72/1268<br>370/329 |
| 2024/0397451 | A1* | 11/2024 | Gao | H04W 52/04 |

OTHER PUBLICATIONS

International Search Report issued in PCT/JP2021/017885 on Dec. 21, 2021 (5 pages).

(Continued)

*Primary Examiner* — Clemence S Han
(74) *Attorney, Agent, or Firm* — Osha Bergman Watanabe & Burton LLP

(57) ABSTRACT

A terminal according to an aspect of the present disclosure includes: a receiving section that receives downlink control information including information related to repetition transmission of an uplink shared channel (PUSCH); and a control section that determines, on the basis of the downlink control information, at least one of the number of transmission/reception points for performing the repetition transmission of the PUSCH, and a transmission/reception point or a sounding reference signal resource indicator (SRI) corresponding to each of PUSCH transmissions in the repetition transmission of the PUSCH.

5 Claims, 14 Drawing Sheets

(56) References Cited

OTHER PUBLICATIONS

Written Opinion of the International Searching Authority issued in PCT/JP2021/017885 on Dec. 21, 2021 (3 pages).
NTT DOCOMO, Inc.; "Discussion on MTRP for reliability"; 3GPP TSG RAN WG1 #104bis-e, R1-2103560; e-Meeting; Apr. 12-20, 2021 (20 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
Office Action issued in Japanese Patent Application No. 2023-520628, issued Apr. 8, 2025 (6 pages).

* cited by examiner

FIG. 5A

| SPECIFIC DCI FIELD | S-TRP OR M-TRP |
|---|---|
| 0 | S-TRP |
| 1 | M-TRP |

FIG. 5B

| SPECIFIC DCI FIELD | S-TRP OR M-TRP | BEAM MAPPING |
|---|---|---|
| 00 | S-TRP REPETITION | ONLY S-TRP #1 |
| 01 | S-TRP REPETITION | ONLY S-TRP #2 |
| 10 | M-TRP REPETITION | PATTERN #1 |
| 11 | M-TRP REPETITION | PATTERN #2 |

FIG. 10A

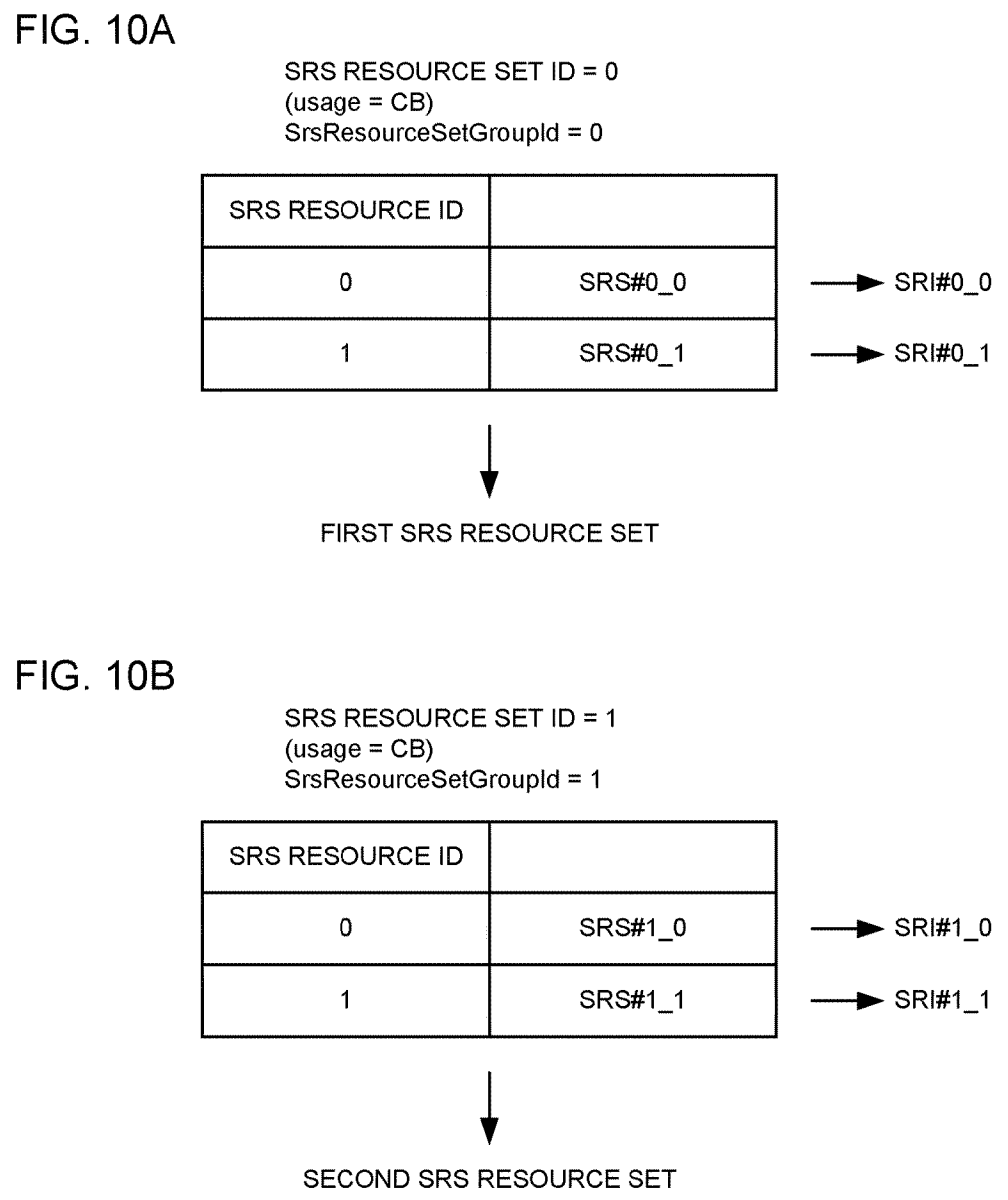

SRS RESOURCE SET ID = 0
(usage = CB)
SrsResourceSetGroupId = 0

| SRS RESOURCE ID | |
|---|---|
| 0 | SRS#0_0 |
| 1 | SRS#0_1 |

→ SRI#0_0
→ SRI#0_1

↓

FIRST SRS RESOURCE SET

FIG. 10B

SRS RESOURCE SET ID = 1
(usage = CB)
SrsResourceSetGroupId = 1

| SRS RESOURCE ID | |
|---|---|
| 0 | SRS#1_0 |
| 1 | SRS#1_1 |

→ SRI#1_0
→ SRI#1_1

↓

SECOND SRS RESOURCE SET

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (for example, also referred to as "5th generation mobile communication system (5G)," "5G+(plus)," "6th generation mobile communication system (6G)," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In 3GPP Rel. 15, repetition transmission of a UL data channel (for example, uplink shared channel (Physical Uplink Shared Channel (PUSCH))) is supported. A UE controls to perform a plurality of PUSCH transmissions on the basis of a repetition factor K configured from a network (for example, base station).

Meanwhile, in Rel. 17 (or Beyond-5G, 6G) or later versions, communication using one transmission/reception point (TRP) or a plurality of TRPs is under study.

However, in NR specifications thus far, studies have not sufficiently been made on how to control repetition transmission of a UL channel for one TRP (for example, single-TRP) and a plurality of TRPs (for example, multi-TRP). Unless repetition transmission of a PUSCH for the single-TRP/multi-TRP is appropriately performed, the throughput or communication quality may be deteriorated.

In view of this, the present disclosure has one object to provide a terminal, a radio communication method, and a base station that enable appropriate control of a PUSCH transmission even when the single-TRP/multi-TRP is used.

Solution to Problem

A terminal according to an aspect of the present disclosure includes: a receiving section that receives downlink control information including information related to repetition transmission of an uplink shared channel (PUSCH); and a control section that determines, on the basis of the downlink control information, at least one of the number of transmission/reception points for performing the repetition transmission of the PUSCH, and a transmission/reception point or a sounding reference signal resource indicator (SRI) corresponding to each of PUSCH transmissions in the repetition transmission of the PUSCH.

Advantageous Effects of Invention

According to an aspect of the present disclosure, even when the single-TRP/multi-TRP is used, a PUSCH transmission can be appropriately controlled.

BRIEF DESCRIPTION OF DRAWINGS

FIGS. 5A and 5B are each a diagram to show an example of a specific DCI field according to a first embodiment.

FIGS. 10A and 10B are diagrams to show other examples of an SRS resource set/SRS resources corresponding to a first SRS resource set/second SRS resource set.

DESCRIPTION OF EMBODIMENTS (Repetition Transmission)

In Rel. 15, repetition transmission is supported in data transmission. For example, a base station (a network (NW), a gNB) repeats transmission of DL data (for example, a downlink shared channel (PDSCH)) a certain number of times. Alternatively, a UE repeats transmission of UL data (for example, an uplink shared channel (PUSCH)) a certain number of times.

Figure 1A:
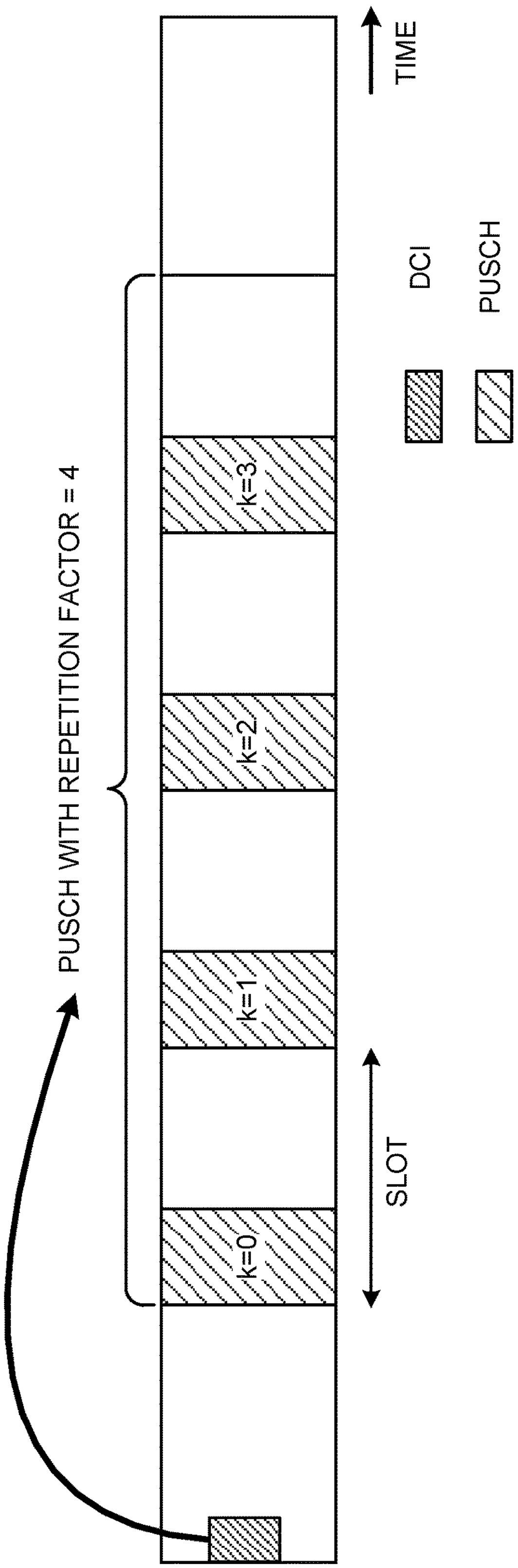
FIGS. 1A and 1B are each a diagram to show an example of repetition transmission of a PUSCH.

FIG. 1A is a diagram to show an example of repetition transmission of a PUSCH. FIG. 1A shows an example in which PUSCHs for a certain number of times of repetition are scheduled by a single piece of DCI. The number of times of repetition is also referred to as a repetition factor K or an aggregation factor K.

In FIG. 1A, the repetition factor K=4, but the value of K is not limited to this. The n-th repetition may also be referred to as the n-th transmission occasion or the like, and may be identified by a repetition index k (0≤k≤K−1). FIG. 1A shows the repetition transmission of the PUSCH (for example, dynamic-grant based PUSCH) dynamically scheduled by the DCI, but the embodiments may be applied to repetition transmission of a configured-grant based PUSCH.

For example, in FIG. 1A, a UE semi-statically receives information (for example, aggregationFactorUL or aggregationFactorDL) indicating the repetition factor K through higher layer signaling. Here, for example, the higher layer signaling may be any one or combinations of RRC (Radio Resource Control) signaling, MAC (Medium Access Control) signaling, broadcast information, and the like.

For example, the MAC signaling may use MAC control elements (MAC CE), MAC PDUs (Protocol Data Units), and the like. For example, the broadcast information may be master information blocks (MIBs), system information blocks (SIBs), minimum system information (RMSI (Remaining Minimum System Information)), and the like.

The UE controls PDSCH reception processing (for example, at least one of reception, de-mapping, demodulation, and decoding) or PUSCH transmission processing (for example, at least one of transmission, mapping, modulation, and coding) in K consecutive slots, on the basis of at least one of the following field values (or information indicated in the field value) in the DCI:

- Allocation of time domain resources (for example, a start symbol, the number of symbols in each slot, and the like);
- Allocation of frequency domain resources (for example, a certain number of resource blocks (RBs), a certain number of resource block groups (RBGs));
- Modulation and coding scheme (MCS) index;
- Configuration of a demodulation reference signal (DMRS) of the PUSCH;
- Spatial relation information (spatial relation info) of the PUSCH, or a state of transmission configuration indication (or transmission configuration indicator (TCI)) (TCI state (TCI-state)).

Identical symbol allocation may be applied between the K consecutive slots. FIG. 1A shows a case where the PUSCH in each slot is allocated to a certain number of symbols from the head of the slot. The identical symbol allocation between the slots may be determined as described in the time domain resource allocation above.

For example, the UE may determine the symbol allocation in each slot on the basis of a start symbol S and the number of symbols L (for example, Start and Length Indicator (SLIV)) determined based on a value m of a certain field (for example, TDRA field) in the DCI. Note that the UE may determine the first slot on the basis of K2 information determined based on the value m of the certain field (for example, TDRA field) in the DCI.

Meanwhile, between the K consecutive slots, redundancy versions (RV) to be applied to TBs based on identical data may be identical or at least partially different from each other. For example, the RV to be applied to the TB in the n-th slot (transmission occasion, repetition) may be determined based on a value of a certain field (for example, RV field) in the DCI.

When resources allocated in the K consecutive slots are different from, in communication direction in at least one symbol, a UL, DL, or flexible in each slot specified by at least one of uplink/downlink communication direction indication information (for example, “TDD-UL-DL-ConfigCommon”, “TDD-UL-DL-ConfigDedicated” of an RRC IE) for TDD control and a slot format indicator in the DCI (for example, DCI format 2_0), a resource in a slot including the symbol may be configured not to be transmitted (or not to be received).

In Rel. 15, as shown in FIG. 1A, a PUSCH is repeatedly transmitted over a plurality of slots (in a unit of slot). In Rel. 16 or later versions, repetition transmission of a PUSCH is assumed to be performed in a unit (for example, a unit of subslot, a unit of mini-slot, or a unit of a certain number of symbols) shorter than a slot (see FIG. 1B).

Figure 1B:
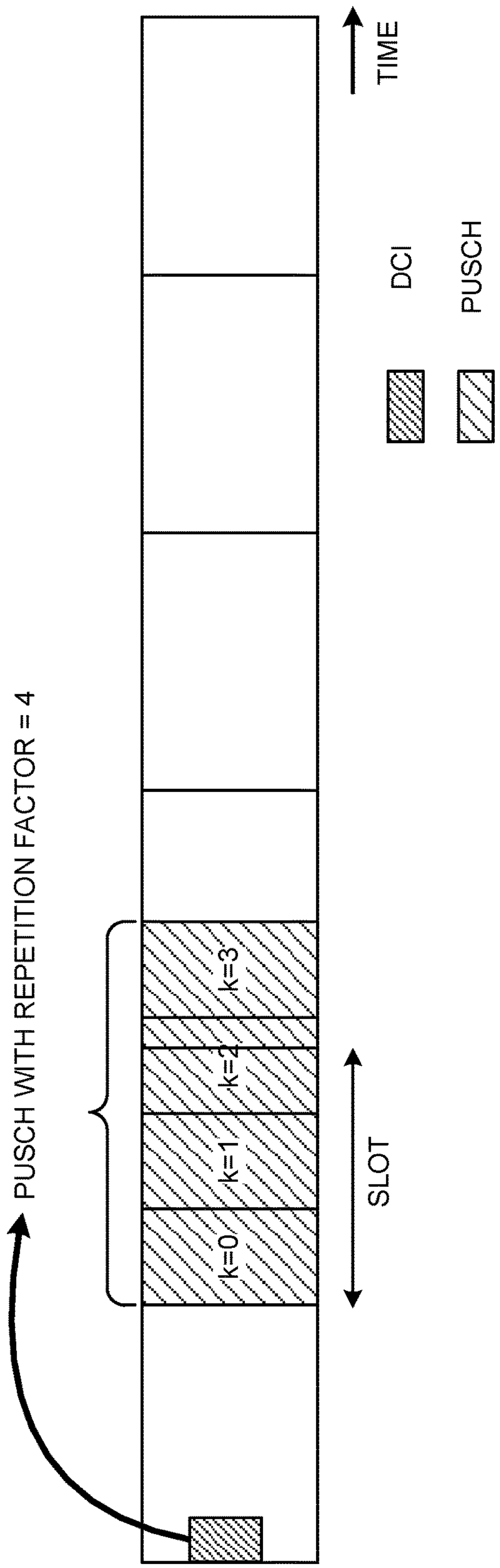

In FIG. 1B, the repetition factor K=4, but the value of K is not limited to this. The n-th repetition may also be referred to as the n-th transmission occasion or the like, and may be identified by the repetition index k (0≤k≤K−1). FIG. 1B shows repetition transmission of a PUSCH (for example, dynamic-grant based PUSCH) dynamically scheduled by DCI, but the embodiments may be applied to repetition transmission of a configured-grant based PUSCH.

The UE may determine symbol allocation for a PUSCH transmission (for example, PUSCH with k=0) in a certain slot on the basis of a start symbol S and the number of symbols L (for example, StartSymbol and length) determined based on a value m of a certain field (for example, TDRA field) in the DCI for the PUSCH. Note that the UE may determine the certain slot on the basis of Ks information determined based on the value m of the certain field (for example, TDRA field) in the DCI.

The UE may dynamically receive, through downlink control information, information (for example, numberofrepetitions) indicating the repetition factor K. The repetition factor may be determined based on the value m of the certain field (for example, TDRA field) in the DCI. For example, a table may be supported in which a correspondence relation between a bit value, the repetition factor K, the start symbol S, and the number of symbols L notified in the DCI is defined.

The slot-based repetition transmission shown in FIG. 1A may be referred to as repetition transmission type A (for example, PUSCH repetition Type A), and the sub-slot based repetition transmission shown in FIG. 1B may be referred to as repetition transmission type B (for example, PUSCH repetition Type B).

The UE may be configured with application of at least one of the repetition transmission type A and the repetition transmission type B. For example, the repetition transmission type to be applied to the UE may be notified from a base station to the UE through higher layer signaling (for example, PUSCHRepTypeIndicator).

Either of the repetition transmission type A or the repetition transmission type B may be configured for the UE for each DCI format scheduling a PUSCH.

For example, regarding a first DCI format (for example, DCI format 0_1), when higher layer signaling (for example, PUSCHRepTypeIndicator-AorDCIFormat0_1) is configured to the repetition transmission type B (for example, PUSCH-RepTypeB), the UE applies the repetition transmission type B to PUSCH repetition transmission scheduled by the first DCI format. Otherwise (for example, when PUSCH-RepTypeB is not configured or PUSCH-RepTypeA is configured), the UE applies the repetition transmission type A to PUSCH repetition transmission scheduled by the first DCI format.

In Rel. 16 or later versions, performing dynamic switch between a single PUSCH transmission and repetition transmission of a PUSCH is under study.

For the UE, when a higher layer parameter (for example, pusch-TimeDomainAllocationListDCI-0-1-r16 or pusch-TimeDomainAllocationListDCI-0-2-r16) related to the time domain allocation for a PUSCH is configured, the number of times of repetition (for example, 1, 2, 3, 4, 7, 8, 12, or 16) may be configured using a parameter (for example, numberOfRepetitions-r16) related to the number of times of repetition of the PUSCH, the parameter included in the higher layer parameter. Based on a time domain resource allocation field in DCI, the UE may determine the number of times of repetition of the PUSCH scheduled by the DCI. When the number of times of repetition is configured/specified to one, the UE may perform the single PUSCH transmission.

(Spatial Relation for SRS and PUSCH)

In Rel-15 NR, a UE may receive information to be used in transmission of a reference signal for measurement (for example, sounding reference signal (SRS)) (SRS configuration information, for example, a parameter in an RRC control element "SRS-Config").

Specifically, the UE may receive at least one of information related to one or a plurality of SRS resource sets (SRS resource set information, for example, an RRC control element "SRS-ResourceSet") and information related to one or a plurality of SRS resources (SRS resource information, for example, an RRC control element "SRS-Resource").

One SRS resource set may be associated with a certain number of (for example, one or more or a plurality of) SRS resources (the certain number of SRS resources may be grouped). Each SRS resource may be identified by an SRS resource indicator (SRI) or an SRS resource ID (Identifier).

The SRS resource set information may include information about an SRS resource set ID (SRS-ResourceSetId), a list of SRS resource IDs (SRS-ResourceId) to be used in the resource set, an SRS resource type (for example, any one of periodic SRS, semi-persistent SRS, and aperiodic SRS (Aperiodic SRS)), and a usage of SRS.

Here, the SRS resource type may indicate any one of periodic SRS (P-SRS), semi-persistent SRS (SP-SRS), and aperiodic SRS (Aperiodic SRS (A-SRS)). Note that the UE may transmit a P-SRS and SP-SRS periodically (or periodically after activation), and may transmit an A-SRS on the basis of an SRS request in the DCI.

The usage (an RRC parameter "usage", L1 (Layer-1) parameter "SRS-SetUse") may be, for example, beam management (beamManagement), codebook (CB), noncodebook (NCB), antenna switching, and the like. An SRS of the codebook (CB) or noncodebook (NCB) usage may be used for determination of a precoder for codebook-based or non-codebook-based PUSCH transmission based on an SRI.

For example, for the codebook-based transmission, the UE may determine a precoder for PUSCH transmission on the basis of an SRI, a transmitted rank indicator (TRI), and a transmitted precoding matrix indicator (TRMI). For the non-codebook-based transmission, the UE may determine a precoder for PUSCH transmission on the basis of an SRI.

The SRS resource information may include an SRS resource ID (SRS-ResourceId), the number of SRS ports, an SRS port number, a transmission Comb, SRS resource mapping (for example, time and/or frequency resource position, resource offset, periodicity of resource, the number of times of repetition, the number of SRS symbols, SRS bandwidth, and the like), hopping-related information, an SRS resource type, a sequence ID, spatial relation information of SRS, and the like.

The spatial relation information of SRS (for example, an RRC information element "spatialRelationInfo") may indicate spatial relation information between a certain reference signal and an SRS. The certain reference signal may be at least one of a synchronization signal/broadcast channel (Synchronization Signal/Physical Broadcast Channel (SS/PBCH)) block, a channel state information reference signal (CSI-RS), and an SRS (for example, another SRS). The SS/PBCH block may be referred to as a synchronization signal block (SSB).

The spatial relation information of SRS may include, as an index of the certain reference signal, at least one of an SSB index, a CSI-RS resource ID, and an SRS resource ID.

Note that, in the present disclosure, an SSB index, an SSB resource ID, and an SSB Resource Indicator (SSBRI) may be interchangeably interpreted. A CSI-RS index, a CSI-RS resource ID, and a CSI-RS Resource Indicator (CRI) may be interchangeably interpreted. An SRS index, an SRS resource ID, and an SRI may be interchangeably interpreted.

The spatial relation information of SRS may include a serving cell index, a BWP index (BWP ID), and the like corresponding to the certain reference signal.

For a certain SRS resource, when spatial relation information related to an SSB or CSI-RS and the SRS is configured, the UE may transmit the certain SRS resource by using a spatial domain filter (spatial domain transmission filter) the same as a spatial domain filter (spatial domain reception filter) for reception of the SSB or CSI-RS. In this case, the UE may assume that a UE receive beam of the SSB or CSI-RS and a UE transmit beam of the SRS are the same.

For a certain SRS (target SRS) resource, when spatial relation information related to another SRS (reference SRS) and the SRS (target SRS) is configured, the UE may transmit the target SRS resource by using a spatial domain filter (spatial domain transmission filter) the same as a spatial domain filter (spatial domain transmission filter) for transmission of the reference SRS. In other words, in this case, the UE may assume that a UE transmit beam of the reference SRS and a UE transmit beam of the target SRS are the same.

Based on a value of a certain field (for example, SRS resource indicator (SRI) field) in DCI (for example, DCI format 0_1), the UE may determine spatial relation of a PUSCH scheduled by the DCI. Specifically, for the PUSCH transmission, the UE may use the spatial relation information of SRS resource (for example, an RRC information element "spatialRelationInfo") determined based on the value of the certain field (for example, SRI).

When the codebook-based transmission is used for the PUSCH, the UE may be configured, by RRC, with two SRS resources per SRS resource set and may be indicated, by the DCI (SRI field of one bit), one of the two SRS resources. When the non-codebook-based transmission is used for the PUSCH, the UE may be configured, by the RRC, with four SRS resources per SRS resource set and may be indicated, by the DCI (SRI field of two bits), one of the four SRS resources.

(TPMI and Transmission Rank)

In Rel. 16, it is under study that a transmitted precoding matrix indicator (TPMI) and a transmission rank for codebook-based PUSCH transmission are specified in a specific field (for example, precoding information and number-of-layer field) included in downlink control information (for example, DCI format 0_1).

A precoder that the UE uses for the codebook-based PUSCH transmission may be selected from an uplink codebook having the number of antenna ports equal to a value configured using a higher layer parameter (for example, nrofSRS-Ports) configured for an SRS resource.

The size (the number of bits) of the specific field is variable depending on the number of antenna ports (for example, the number of ports indicated by nrofSRS-Ports above) for a PUSCH and some higher layer parameters.

The specific field may be zero bits when a higher layer parameter (for example, txConfig) configured for the UE is configured to noncodebook (nonCodebook).

For one antenna port, when the higher layer parameter (for example, txConfig) configured for the UE is configured to codebook, the specific field may be zero bits.

For four antenna ports, when the higher layer parameter (for example, txConfig) configured for the UE is configured to codebook, the specific field may have a bit length of two to six bits on the basis of at least one of another higher layer parameter configured for the UE and whether there is a transform precoder (enabled or disabled).

For two antenna ports, when the higher layer parameter (for example, txConfig) configured for the UE is configured to codebook, the specific field may have a bit length of one to four bits on the basis of at least one of another higher layer parameter configured for the UE and whether there is a transform precoder (enabled or disabled).

Such another higher layer parameter may be at least one of a parameter (for example, ul-FullPowerTransmission) to specify a full power transmission mode for a UL, a parameter (for example, maxRank) indicating the maximum value of the transmission rank of the UL, a parameter (for example, codebookSubset) indicating a subset of a certain precoding matrix indicator (PMI), and a parameter (for example, transformPrecoder) to specify a transform precoder.

(Multi-TRP)

Figure 2:
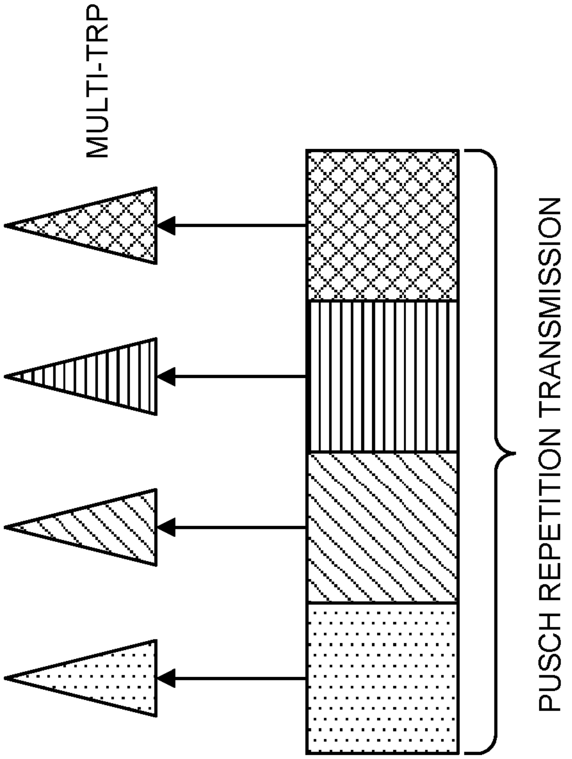
FIG. 2 is a diagram to show an example of repetition transmission of a PUSCH for multi-TRP.

For NR, it is under study that one or a plurality of transmission/reception points (TRPs) (multi-TRP) perform a DL transmission to a UE by using one or a plurality of panels (multi-panel). It is also under study that a UE performs a UL transmission to one or a plurality of TRPs (see FIG. 2).

The plurality of TRPs may correspond to the same cell identifier (ID) or may correspond to different cell IDs. The cell ID (s) may be a physical cell ID (s) or may be a virtual cell ID (s).

Figure 3A:
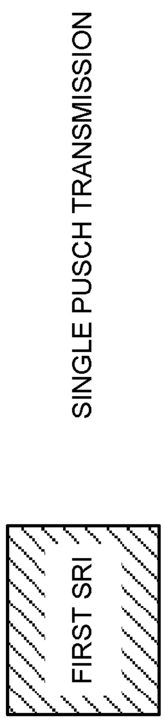
FIGS. 3A to 3C are diagrams to show examples of a single PUSCH transmission, repetition transmission of a PUSCH for a single TRP, and repetition transmission of a PUSCH for a plurality of TRPs.
Figure 3B:
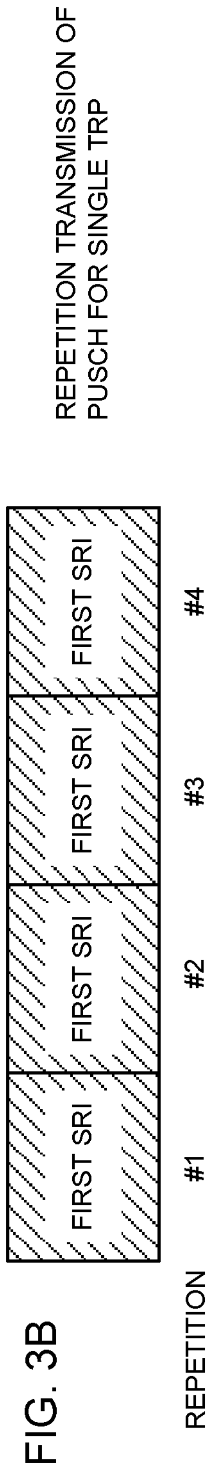
Figure 3C:
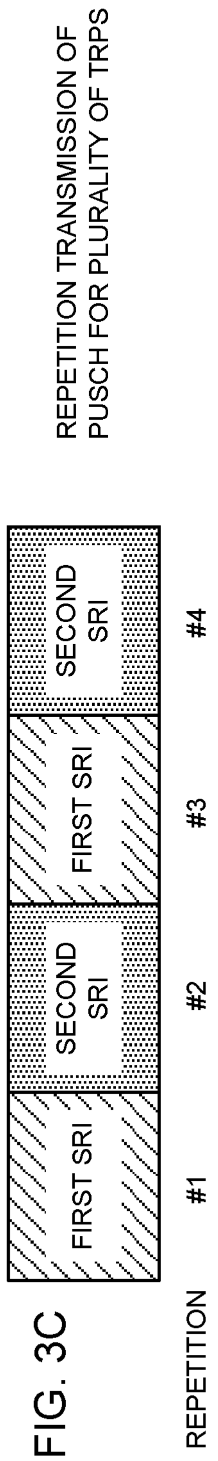

FIGS. 3A to 3C are diagrams to show examples of a single PUSCH transmission, repetition transmission of a PUSCH for a single TRP, and repetition transmission of a PUSCH for a plurality of TRPs. In the example shown in FIG. 3A, a UE performs a single PUSCH transmission by using a first SRI determined from a first SRI field. In the example shown in FIG. 3B, the UE performs repetition transmission of a PUSCH for a single TRP by using the first SRI determined from the first SRI field. In the example shown in FIG. 3C, the UE performs repetition transmission of a PUSCH for a plurality of TRPs by using the first SRI determined from the first SRI field and a second SRI determined from a second SRI field. For the repetition transmission of the PUSCH, the schedule may be controlled based on one piece of DCI.

Figure 4:
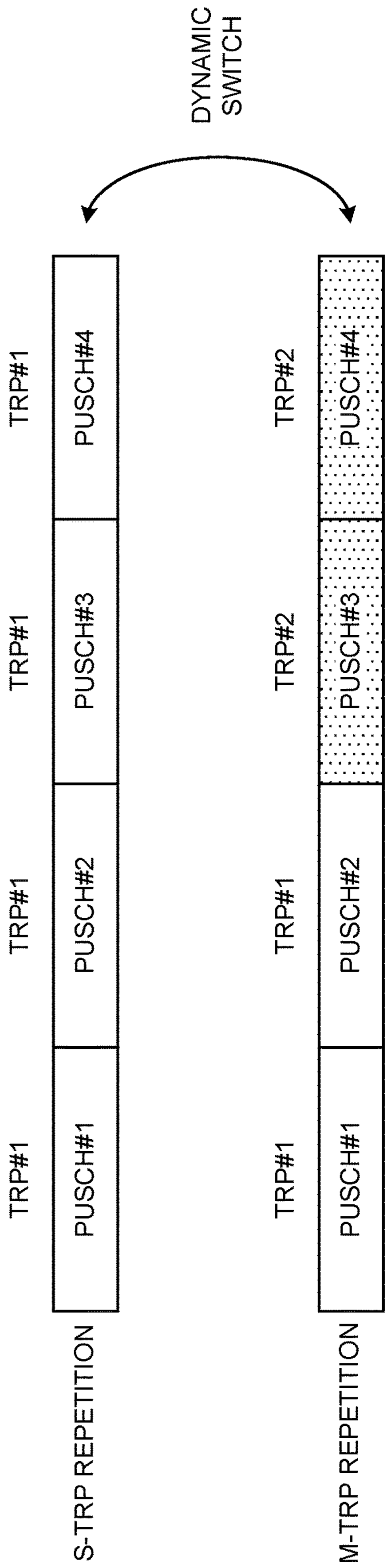
FIG. 4 is a diagram to show an example of switching between repetition transmission of a PUSCH for a single TRP and repetition transmission of a PUSCH for a plurality of TRPs.

For NR in Rel. 16 or later versions, dynamic switching between a single PUSCH transmission/repetition transmission of a PUSCH for a single TRP and repetition transmission of a PUSCH for a plurality of TRPs (for example, two TRPs) is under study (see FIG. 4). FIG. 4 shows an example of a case where repetition transmission of a PUSCH for a single TRP (S-TRP repetition) with the number of times of repetition being four and repetition transmission of a PUSCH for a plurality of TRPs (M-TRP repetition) with the number of times of repetition being four are dynamically switched (changed over).

In NR specifications thus far, studies have not sufficiently been made on how to control dynamic switching between a single PUSCH transmission/repetition transmission of a PUSCH for a single TRP and repetition transmission of a PUSCH for a plurality of TRPs.

Studies have not sufficiently been made on how to control transmission of a reference signal (for example, SRS) corresponding to the PUSCH transmission when the single PUSCH transmission/repetition transmission of the PUSCH for a single TRP is applied or the repetition transmission of the PUSCH for a plurality of TRPs is applied.

Unless the repetition transmission of the PUSCH (or transmission of the reference signal corresponding to the PUSCH transmission) is appropriately performed, the throughput may be reduced or communication quality may be degraded.

The inventors of the present invention studied on repetition transmission of a PUSCH (or transmission of a reference signal corresponding to the PUSCH transmission) when single-TRP/multi-TRP is applied, and came up with the idea of the present embodiments.

Embodiments according to the present disclosure will be described in detail with reference to the drawings as follows. The radio communication methods according to respective embodiments may each be employed individually, or may be employed in combination.

Note that, in the present disclosure, a port, a panel, a beam, an Uplink (UL) transmission entity, a TRP, spatial relation information (SRI), a spatial relation, a control resource set (CORESET), a PDSCH, a codeword, a base station, a certain antenna port (for example, a demodulation reference signal (DMRS) port), a certain antenna port group (for example, a DMRS port group), a certain group (for example, a code division multiplexing (CDM) group, a certain reference signal group, a CORESET group, a panel group, a beam group, a spatial relation group, a PUCCH group), and a CORESET pool may be interchangeably interpreted. A panel Identifier (ID) and a panel may be interchangeably interpreted. A TRP ID and a TRP may be interchangeably interpreted.

In the present disclosure, an index, an ID, an indicator, and a resource ID may be interchangeably interpreted.

In the present disclosure, "A/B" may mean "at least one of A and B." In the present disclosure, "A/B/C" may mean "at least one of A, B, and C."

In the present disclosure, a list, a group, a cluster, a subset, and the like may be interchangeably interpreted. In the present disclosure, spatial relation information (SRI), an SRS resource indicator (SRI) (or an SRI field), an SRS resource, an SRS resource set, a precoder, and the like may be interchangeably interpreted.

In the present disclosure, spatial relation information (SRI), a combination of SRIs, SRI for codebook-based transmission, a combination of non-codebook-based SRIs, spatialRelationInfo, UL TCI, TCI state, Unified TCI, QCL, and the like may be interchangeably interpreted.

In the present disclosure, a first TRP and a second TRP may be interchangeably interpreted as a first PUSCH and a second PUSCH, a first PUSCH transmission occasion and a second PUSCH transmission occasion, first SRI and second SRI, and the like.

In the following embodiments, repetition transmission of a PUSCH for a plurality of TRPs may be interchangeably interpreted as a PUSCH over a plurality of TRPs, a repetition PUSCH over a plurality of TRPs, a repetition PUSCH simply, repetition transmission, a plurality of PUSCH transmissions, and the like. A single PUSCH transmission for a single TRP may be referred to as a single PUSCH transmission simply, a PUSCH transmission in a single TRP, and the like.

In the present disclosure, repetition transmission of a PUSCH for a single TRP may mean repetition transmission of a plurality of PUSCHs transmitted using the same SRI/beam/precoder.

In the present disclosure, repetition transmission of a PUSCH for a plurality of TRPs may mean repetition transmission of a plurality of PUSCHs transmitted using a plurality of different SRIs/beams/precoders. As described in the mapping pattern above in detail, the repetition transmission may correspond to the plurality of SRIs/beams/precoders cyclically, correspond to each specific number of SRIs/beams/precoders sequentially, or correspond using a half-half pattern (mapping).

In the embodiments in the present disclosure, an example of a case is mainly described in which the number of each of the plurality of TRPs, the plurality of SRIs, and the like is two, but the number may be three or more. “Dynamic switch” in the present disclosure may mean “switch using at least one of higher layer signaling and physical layer signaling.” “Switch” in the present disclosure may be interchangeably interpreted as switching, change, changing, application, and the like.

The embodiments in the present disclosure are also applicable as appropriate to repetition transmission of any UL signal/channel for a plurality of TRPs. A PUSCH in the present disclosure may be interpreted as any UL signal/channel. For example, the embodiments in the present disclosure are also applicable as appropriate to repetition transmission of a PUCCH for a plurality of TRPs. A PUSCH in the present disclosure may be interpreted as a PUCCH.

In the present disclosure, a first TRP (for example, TRP #1) and a second TRP (for example, TRP #2) may correspond to first spatial relation (for example, 1st spatial relation)/beam/UL TCI/QCL and second spatial relation/beam/UL TCI/QCL, respectively. Alternatively, the first TRP (for example, TRP #1) and the second TRP (for example, TRP #2) may correspond to spatial relation/beam/UL TCI/QCL associated with a first SRI field or first TPMI field and spatial relation/beam/UL TCI/QCL associated with a second SRI field or second TPMI field, respectively. Alternatively, the first TRP (for example, TRP #1) and the second TRP (for example, TRP #2) may correspond to a first SRS resource set with a usage of CB/NCB (for example, usage=CB/NCB) and a second SRS resource set with a usage of CB/NCB (for example, usage=CB/NCB), respectively.

(Radio Communication Method)

First Embodiment

In a first embodiment, performing either of repetition transmission for a single TRP or repetition transmission for a plurality of TRPs is notified based on a specific field included in DCI. The repetition transmission for the single TRP may be interpreted as a single PUSCH transmission.

A UE may determine whether or not to perform either the repetition transmission for the single TRP or the repetition transmission for the plurality of TRPs on the basis of a specific field (specific DCI field) included in DCI. The UE may determine, based on the DCI (or specific DCI field), a TRP (or SRS resource/SRS resource set/spatial relation/beam/UL TCI/QCL used for a PUSCH transmission) that the PUSCH transmission corresponds to.

The specific DCI field may be a field newly added to a DCI format in an existing system (for example, Rel. 15). The specific field (or specific DCI field) may be referred to as, for example, a TRP switching indicator, a multi spatial relation indicator, a beam mapping indicator, a PUSCH repetition indicator, or the like.

The size (or payload) of the specific DCI field may be a fixed value (Option 1-1). The size of the specific DCI field may be configured to be variable (Option 1-2). The specific DCI field may be included in DCI scheduling a PUSCH that repetition transmission is applied to.

[Option 1-1]

When the specific DCI field is configured with a fixed size (or fixed DCI payload), the size of the specific DCI field may be defined in a specification. Whether the specific DCI field is included in the DCI may be configured by a higher layer (for example, RRC). When the presence of the specific DCI field is notified/configured through higher layer signaling, the UE may assume that the specific DCI field is included in the DCI.

When the specific DCI field is one bit, the one bit may indicate repetition transmission for a single TRP or repetition transmission for a plurality of TRPs (see FIG. 5A).

When the specific DCI field is plural (for example, two bits), the two bits may indicate repetition transmission for a plurality of TRPs, repetition transmission for a single TRP (first TRP #1), or repetition transmission for a single TRP (second TRP #2). In other words, for the repetition transmission for the single TRP, the code point of the specific DCI field may specify information related to the TRP being the destination for the PUSCH transmission. The information related to the TRP may be information (for example, SRI/SRS resource set/SRS resource) related to an SRS used for/corresponding to the PUSCH transmission.

With the specific DCI field of two bits, four states can be specified. For example, when the code point of the specific DCI field notifies the repetition transmission for the plurality of TRPs, a TRP/beam mapping pattern may be specified (see FIG. 5B). The mapping pattern may be referred to as a mapping rule, beam mapping rule, correspondence pattern, correspondence beam pattern, correspondence relation, or the like.

For example, the code point of the specific DCI field may indicate the repetition transmission for the plurality of TRPs using a first mapping pattern, the repetition transmission for the plurality of TRPs using a second mapping pattern, the repetition transmission for the single TRP (first TRP #1), or the repetition transmission for the single TRP (second TRP #2).

The mapping pattern may be indicated by an SRI/SRI field/SRS resource/SRS resource set/TRP used for or corresponding to the PUSCH repetition transmission (for example, each PUSCH transmission). For example, when the repetition transmission for the plurality of TRPs is supported, a plurality of SRI fields may be notified/configured for the UE (or the plurality of SRI fields may be included in the DCI), or a plurality of SRS resources/SRS resource sets may be notified/configured for the UE.

Alternatively, one SRI field may be configured in the DCI, and the UE may, based on the SRI field, switch an SRS resource set/SRS resource to be used for each PUSCH transmission. For example, the UE may use a first SRS resource set/SRS resource (corresponding to the first SRI field) for PUSCH #1, and may use a second SRS resource set/SRS resource (corresponding to the first SRI field) for PUSCH #2.

In a mapping pattern applied to repetition transmission of a PUSCH for a plurality of TRPs, a plurality of SRIs/SRI fields (hereinafter, also simply expressed as SRIs) may cyclically correspond to a plurality of transmissions in repetition transmission. The mapping pattern may be referred to as cyclical mapping, a cyclical pattern, a cyclical correspondence, or the like.

Figure 6A:
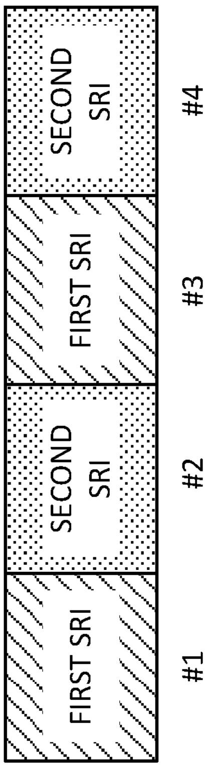
FIGS. 6A and 6B are each a diagram to show an example of a correspondence between a plurality of SRIs and a plurality of transmissions in repetition transmission.

FIG. 6A is a diagram to show an example in which a plurality of SRIs and a plurality of transmissions in repetition transmission cyclically correspond to each other. In FIG. 6A, with the number of times of repetition being four specified, the UE performs repetition transmission of a PUSCH by using a first SRI and second SRI. In the example shown in FIG. 6A, the UE cyclically performs a PUSCH transmission using the first SRI and a PUSCH transmission using the second SRI. For example, the first SRI may be used for odd-numbered transmissions in the repetition (repetition #1, #3), and the second SRI may be used for even-numbered transmissions in the repetition (repetition #2, #4) (for example, SRI #1, SRI #2, SRI #1, SRI #2).

Alternatively, in a mapping pattern (for example, second mapping pattern) applied to repetition transmission of a PUSCH for a plurality of TRPs, it may be determined that the plurality of SRIs (or SRI fields) correspond to each specific number of (for example, two) transmissions in repetition transmission sequentially. The mapping pattern may be referred to as sequential mapping, a sequential pattern, a sequential correspondence, or the like.

Figure 6B:
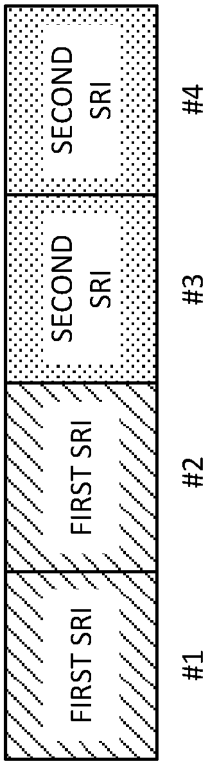

FIG. 6B is a diagram to show an example in which a plurality of SRIs and a plurality of transmissions in repetition transmission sequentially correspond to each other. In FIG. 6B, with the number of times of repetition being four specified, the UE performs repetition transmission of a PUSCH by using a first SRI and second SRI. In the example shown in FIG. 6B, the UE sequentially performs a PUSCH transmission using the first SRI and a PUSCH transmission using the second SRI, two times each (for example, SRI #1, SRI #1, SRI #2, SRI #2).

The code point of the specific DCI field may specify, to the UE, a mapping pattern to be applied to a case where the repetition transmission for the plurality of TRPs is indicated. For example, the first mapping pattern may be the cyclical mapping, and the second mapping pattern may be sequential mapping.

As described above, with use of the code point of the specific DCI field, a mapping pattern for a plurality of TRPs is specified when the repetition transmission for the plurality of TRPs is notified to the UE, so that flexible/dynamic indication of the mapping pattern can be possible without adding any new DCI size.

Variations

A mapping pattern (for example, cyclical mapping or sequential mapping) may be configured by a higher layer parameter/MAC CE, and an order of TRP (or which SRI/SRI field the mapping pattern start with) may be indicated in DCI.

For example, when the cyclical mapping is configured by a higher layer parameter, the specific DCI field may specify a mapping pattern of {SRI #1, SRI #2, SRI #1, SRI #2} or {SRI #2, SRI #1, SRI #2, SRI #1}.

When the sequential mapping is configured by a higher layer parameter, the specific DCI field may specify a mapping pattern of {SRI #1, SRI #1, SRI #2, SRI #2} or {SRI #2, SRI #2, SRI #1, SRI #1}.

[Option 1-2]

The specific DCI field may be configured with a configurable/variable size. For example, in a specification, the maximum X bits (for example, X=2) may be defined as the size of the specific DCI field, and the size of the specific DCI field may be determined based on a configuration/certain condition of a higher layer. Whether the specific DCI field is included in the DCI may be configured by a higher layer (for example, RRC). When the presence of the specific DCI field is notified/configured through higher layer signaling, the UE may assume that the specific DCI field is included in the DCI.

When the specific DCI field of one bit is configured, the one bit may indicate repetition transmission for a single TRP or repetition transmission for a plurality of TRPs (see FIG. 5A).

When the specific DCI field of two bits is configured, the two bits may indicate repetition transmission for a plurality of TRPs, repetition transmission for a single TRP (first TRP #1), or repetition transmission for a single TRP (second TRP #2). In other words, for the repetition transmission for the single TRP, the code point of the specific DCI field may specify information related to the TRP being the destination for the PUSCH transmission. The information related to the TRP may be information (for example, SRI/SRS resource set/SRS resource) related to an SRS used for/corresponding to the PUSCH transmission.

With the specific DCI field of two bits, four states can be specified. For example, when the code point of the specific DCI field notifies the repetition transmission for the plurality of TRPs, a mapping pattern for the plurality of TRPs may be specified (see FIG. 5B). The contents shown in Option 1-1 described above may be applied to the mapping pattern for the plurality of TRPs.

As described above, with use of the code point of the specific DCI field, a mapping pattern for a plurality of TRPs is specified when the repetition transmission for the plurality of TRPs is notified to the UE, so that flexible/dynamic indication of the mapping pattern can be possible without adding any new DCI size.

Alternatively, based on the number of bits of the specific DCI field, the repetition transmission for the single TRP or the repetition transmission for the plurality of TRPs may be indicated. For example, when the specific DCI field of one bit is configured, the repetition transmission for the single TRP may be indicated. In this case, the one bit may indicate whether the repetition transmission is for the first TRP or second TRP. When the specific DCI field of two bits is configured, the two bits may indicate the repetition transmission for the plurality of TRPs, the repetition transmission for the single TRP (first TRP #1), or the repetition transmission for the single TRP (second TRP #2). Alternatively, when the specific DCI field of two bits is configured, the repetition transmission for the plurality of TRPs may be indicated, and the two bits may specify a mapping pattern.

Second Embodiment

In a second embodiment, a configuration of an SRS resource set/SRS resource will be described.

Here, regarding an SRS of the codebook (CB)/noncodebook (NCB) usage, a case where a configuration of a plurality of SRS resource sets is supported (Option 2-1) or a case where one SRS resource set is configured (Option 2-2) will be described as an example, but the embodiment is not limited to this.

The codebook (CB)/noncodebook (NCB) usage may be a case where a certain higher layer parameter (for example, usage=CB/NCB) is configured.

[Option 2-1]

When usage=CB/NCB (for example, when usage=CB/NCB is configured in SRS resource set information), a plurality of SRS resource sets may be configured or a configuration of the plurality of SRS resource sets may be supported.

For example, when usage=CB/NCB, an index of the higher layer may be configured for (or associated with) each of the SRS resource sets. The index of the higher layer may be at least one of a CORESET pool index and a PUCCH repetition index.

Figure 7A:
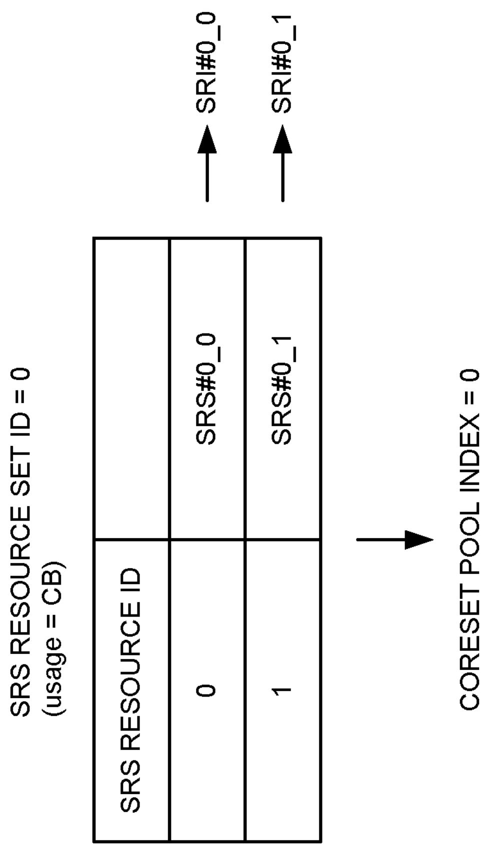
FIGS. 7A and 7B are each a diagram to show an example of association between an SRS resource set/SRS resources and a CORESET pool index.
Figure 7B:
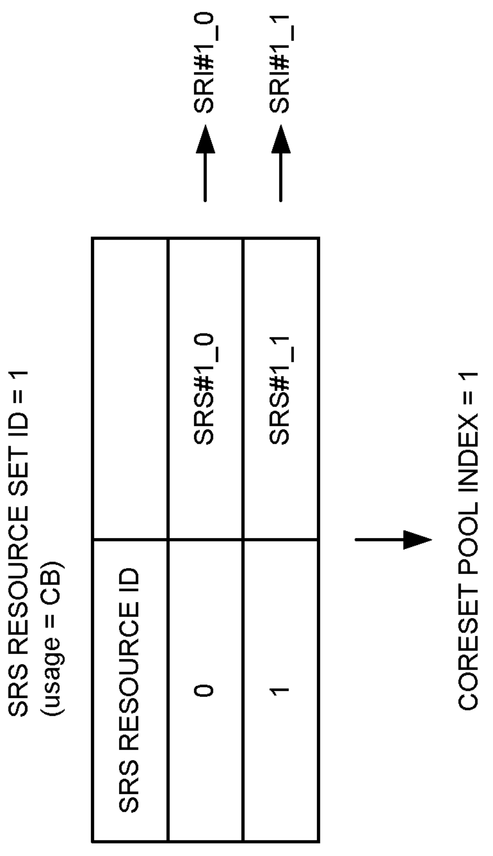

FIGS. 7A and 7B shows cases where a first SRS resource set ID (for example, #0) and a second SRS resource set ID (for example, #1) are configured, when usage=CB. The index of the higher layer (for example, CORESET pool index/PUCCH repetition index) may be configured for each SRS resource set ID.

Here, cases are shown where a first CORESET pool index (for example, #0) is configured for the first SRS resource set ID (for example, #0) (see FIG. 7A) and a second CORESET pool index (for example, #1) is configured for the second SRS resource set ID (for example, #1) (see FIG. 7B).

Note that a CORESET pool index need not be configured for an SRS resource set ID. In this case, the UE may assume that a certain CORESET pool index (for example, #0) corresponds to or is configured for the SRS resource set ID.

An SRS resource (for example, different SRS resource) may be separately associated with each of the first SRS resource set ID (for example, #0) and the second SRS resource set ID (for example, #1). Here, cases are shown where two SRR resources (for example, SRS #0_0 and SRS #0_1) corresponds to the first SRS resource set ID (for example, #0) and two SRS resources (for example, SRS #1_0 and SRS #1_1) corresponds to the second SRS resource set ID (for example, #1).

SRS #0_0 may correspond to SRI #0_0 notified in the DCI and SRS #0_1 may correspond to SRI #0_1 notified in the DCI. Each of SRI #0_0 and SRI #0_1 may correspond to a certain code point of an SRI field. Similarly, SRS #1_0 may correspond to SRI #1_0 notified in the DCI and SRS #1_1 may correspond to SRI #1_1 notified in the DCI. Each of SRI #1_0 and SRI #1_1 may correspond to a certain code point of an SRI field.

Alternatively, the index of the higher layer (for example, CORESET pool index/PUCCH repetition index) may be implicitly configured (associated) for each SRS resource set, without explicitly configured. For example, an index of a certain higher layer (for example, CORESET pool index #0/PUCCH repetition index #0) may be implicitly mapped to the minimum SRS resource set ID (or minimum SRS resource ID). In other words, with respect to each SRS resource set, the index of the higher layer may be associated in the index order.

As described above, a configuration of a plurality of SRS resource sets for each of which a SRS resource is configurable separately is supported, so that an increase in the number of SRS resources included in each SRS resource set can be suppressed. This allows an increase in the number of bits of an SRI field in the DCI to be suppressed.

[Option 2-2]

When usage=CB/NCB (for example, when usage=CB/NCB is configured in SRS resource set information), one SRS resource set may be configured or a configuration of the SRS resource set may be limited to one.

For example, when usage=CB/NCB, an index of a higher layer may be configured (or associated with) for each of different SRS resources included in the one SRS resource set. The index of the higher layer may be at least one of a CORESET pool index and a PUCCH repetition index. In other words, for each of the different SRS resources included in the SRS resource set, association with a different CORESET pool index/different PUCCH repetition index may be supported.

Figure 8:
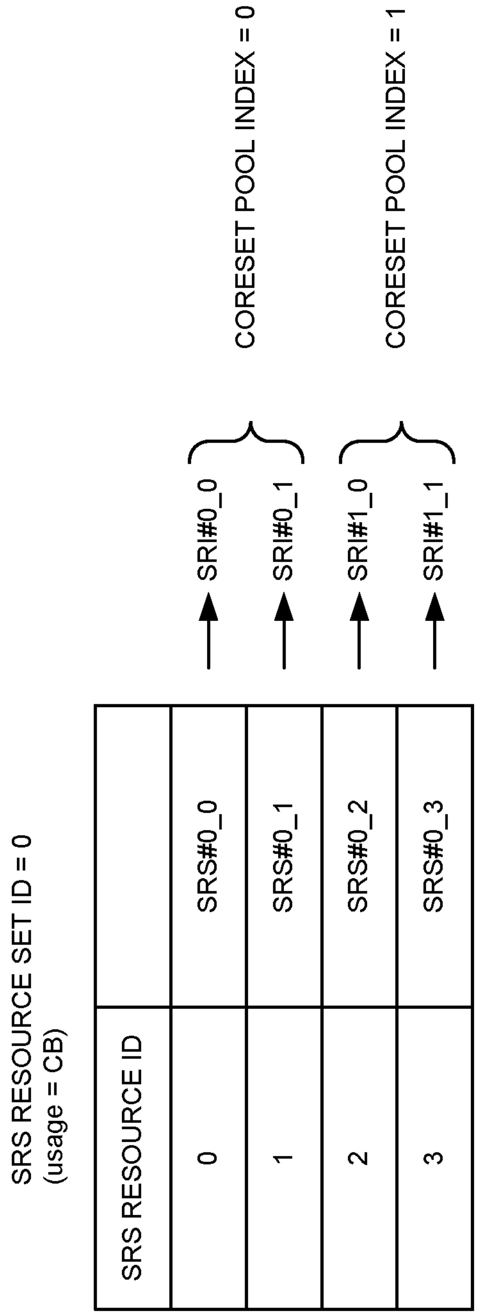
FIG. 8 is a diagram to show an example of association between SRS resources and CORESET pool indices.

FIG. 8 shows a case where one SRS resource set ID (for example, #0) is configured, and different CORESET pool indices are associated with a plurality of SRS resources (at least two SRS resources) included in the SRS resource set ID #0, when usage=CB. Here, a case is shown where a first CORESET pool index (for example, #0) is associated with SRS resources #0_0 and #0_1 and a second CORESET pool index (for example, #1) is associated with SRS resources #0_2 and #0_3.

The number of SRS resources associated with a SRS resource set, a correspondence relation between an SRS resource and a CORESET pool index, and the like are not limited to this.

Note that a CORESET pool index need not be configured for an SRS resource set ID. In this case, the UE may assume that a certain CORESET pool index (for example, #0) is configured for the SRS resource set ID.

Alternatively, the index of the higher layer (for example, CORESET pool index/PUCCH repetition index) may be implicitly configured (associated) for each SRS resource, without explicitly configured. For example, an index of a certain higher layer (for example, CORESET pool index #0/PUCCH repetition index #0) may be implicitly mapped to the minimum SRS resource (or relatively small two SRS resources).

As described above, one (or common) SRS resource set is used for a plurality of TRPs, so that an increase in overhead used for notification of the SRS resource set can be suppressed.

Third Embodiment

In a third embodiment, transmission control will be described for a case where codebook-based (CB based)/non-codebook-based (NCB based) repetition transmission of a PUSCH is performed for a single TRP/a plurality of TRPs.

Here, a case is assumed where, for a codebook-based (CB based)/non-codebook-based (NCB based) PUSCH transmission, a configuration of a plurality of SRS resource sets (for example, two SRS resource sets) is supported, but the embodiment is not limited to this. In the following description, a case will be described where a first SRS resource set (ID=0) and a second SRS resource set (ID=1) are configured, as SRS resource sets.

[CB based UL Transmission]

For CB based, for example, two SRS resources per SRS resource set may be configured for the UE through higher layer signaling, and one of the two SRS resources may be indicated, by the DCI (for example, SRI field of one bit), for the UE.

For CB based UL MIMO for a PUSCH, a certain SRI field/SRS resource set may be used in repetition transmission for a single TRP and repetition transmission for a plurality of TRPs. The repetition transmission for the single TRP may be interpreted as a single PUSCH transmission (or a case where the number of times of repetition of a PUSCH (for example, repetition number) is one).

<<Repetition Transmission for Single-TRP>>

When repetition transmission for a single TRP is indicated, an SRI field/SRS resource set corresponding to each TRP may be used. For example, when a first TRP (for example, TRP #1) is specified for the repetition transmission for the single TRP, the UE may use a first SRI field/first SRS resource set for the repetition transmission of a PUSCH.

When a second TRP (for example, TRP #2) is specified for the repetition transmission for the single TRP, the UE may use a second SRI field/second SRS resource set for the repetition transmission of a PUSCH.

When a plurality of TPMI fields are supported, the UE may use a specific TPMI field (for example, a first TPMI field). This is because a second TPMI field does not indicate the number of layers.

<<Repetition Transmission for Multi-TRP>>

When repetition transmission for a plurality of TRPs is indicated, a beam mapping pattern may be defined/configured/indicated by a higher layer (for example, RRC)/MAC CE/DCI.

When repetition transmission for a plurality of TRPs is indicated, each of a plurality of (for example, two) SRI fields/SRS resource sets/TPMI fields may be used. For example, a first SRI field/first SRS resource set may be used for a transmission to TRP #1 in the repetition transmission for the plurality of TRPs, and a second SRI field/second SRS resource set may be used for a transmission to TRP #2. A first TPMI field may be used for the transmission to TRP #1 and a second TMPI field may be used for the transmission to TRP #2.

As described above, the first SRI field/first SRS resource set/first TPMI field is used for the repetition transmission for the first TRP (for example, TRP #1) and the second SRI field/second SRS resource set/second TPMI field is used for the repetition transmission for the second TRP (for example, TRP #2), so that a transmission for each TRP can be flexibly controlled.

A mapping between an SRS resource set configured by a higher layer and the first SRS resource set/second SRS resource set may be implicit (for example, implicit mapping) or may be explicit (for example, explicit mapping).

<<Implicit Mapping>>

An SRS of the codebook/noncodebook usage may be configured, and the codebook/noncodebook usage assuming a case where the implicit mapping is applied may be a case where a certain higher layer parameter (for example, usage=CB/NCB) is configured.

Figure 9A:
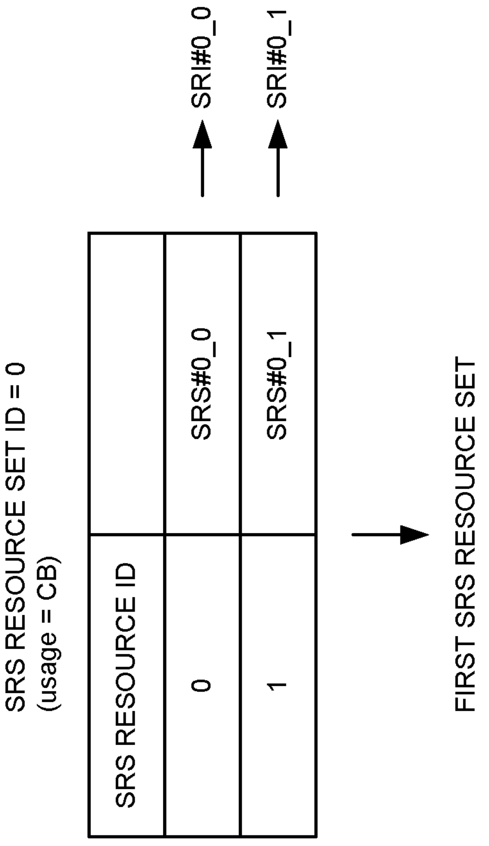
FIGS. 9A and 9B are diagrams to show examples of an SRS resource set/SRS resources corresponding to a first SRS resource set/second SRS resource set.

In this case, a first SRS resource set with usage=CB/NCB (for example, $1^{st}$ SRS resource set with usage=CB/NCB) may mean an SRS resource set having the minimum (or maximum) SRS resource set ID associated with usage=CB/NCB (see FIG. 9A). A second SRS resource set with usage=CB/NCB (for example, $2^{nd}$ SRS resource set with usage=CB/NCB) may mean an SRS resource set having the second smallest (or second largest) SRS resource set ID associated with usage=CB/NCB (see FIG. 9B).

Figure 9B:
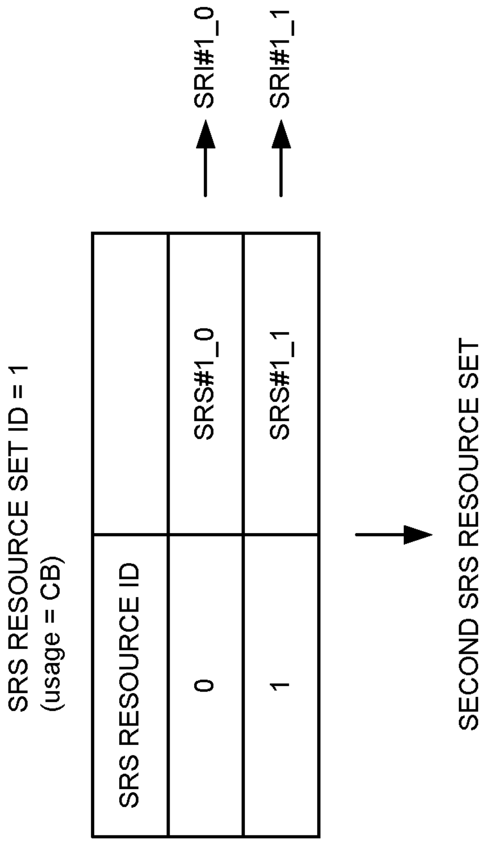

FIG. 9A shows a case where the first SRS resource set corresponds to the minimum SRS resource set ID (here, SRS resource set ID=0) associated with usage=CB. FIG. 9B shows a case where the second SRS resource set corresponds to the second smallest SRS resource set ID (here, SRS resource set ID=1) associated with usage=CB. Each of SRS resource set ID=0 and SRS resource set ID=1 may include another SRS resource.

<<Explicit Mapping>>

When a plurality of SRS resource sets are configured, an SRS resource set corresponding to a first SRS resource set and an SRS resource set corresponding to a second SRS resource set may be notified to the UE. For example, a certain higher layer parameter may be added to each SRS resource set to distinguish between the first SRS resource set and the second SRS resource set.

A higher layer parameter (for example, SrsResourceSetGroupId={0.1}) indicating an SRS resource set group ID may be configured for each SRS resource set with usage=CB/NCB. The UE may determine an SRS resource set configured with SrsResourceSetGroupId=0 as the first SRS resource set (see FIG. 10A), and may determine an SRS resource set configured with SrsResourceSetGroupId=1 as the second SRS resource set (see FIG. 10B).

An SRS resource set not configured with SrsResourceSetGroupId may mean that certain SrsResourceSetGroupId (for example, SrsResourceSetGroupId=0) is configured. For example, when SRS resource set #a is not configured with SrsResourceSetGroupId, the UE may determine that certain SrsResourceSetGroupId (for example, SrsResourceSetGroupId=0) is configured/applied to SRS resource set #a.

[NCB based UL Transmission]

For NCB, for example, four SRS resources per SRS resource set may be configured for the UE through higher layer signaling, and one of the four SRS resources may be indicated, by the DCI (for example, SRI field of two bits), for the UE.

For NCB based UL MIMO for a PUSCH, a certain SRI field/SRS resource set may be used in repetition transmission for a single TRP and repetition transmission for a plurality of TRPs. The repetition transmission for the single TRP may be interpreted as a single PUSCH transmission (or a case where the number of times of repetition of a PUSCH (for example, repetition number) is one).

<<Repetition Transmission for Single-TRP>>

When repetition transmission for a single TRP is indicated, a specific SRI field/SRS resource set corresponding to each TRP may be used. For example, when a first TRP (for example, TRP #1) is specified for the repetition transmission for the single TRP, the UE may use a first SRI field/first SRS resource set for the repetition transmission of a PUSCH.

When a second TRP (for example, TRP #2) is specified for the repetition transmission for the single TRP, the UE may use the first SRI field/second SRS resource set for the repetition transmission of a PUSCH. In other words, the same SRI field may be used for the PUSCH transmission to TRP #1 and TRP #2. This is because a second SRI field does not indicate the number of layers.

<<Repetition Transmission for Multi-TRP>>

When repetition transmission for a plurality of TRPs is indicated, a beam mapping pattern may be defined/configured/indicated by a higher layer (for example, RRC)/MAC CE/DCI.

When repetition transmission for a plurality of TRPs is indicated, each of a plurality of (for example, two) SRI fields/SRS resource sets may be used. For example, a first SRI field/first SRS resource set may be used for a transmission to TRP #1 in the repetition transmission for the plurality of TRPs, and a second SRI field/second SRS resource set may be used for a transmission to TRP #2.

As described above, the first SRI field/first SRS resource set is used for the repetition transmission for the first TRP (for example, TRP #1) and the second SRI field/second SRS resource set is used for the repetition transmission for the second TRP (for example, TRP #2), so that a transmission for each TRP can be flexibly controlled.

A mapping between an SRS resource set configured by a higher layer and the first SRS resource set/second SRS resource set may be implicit (for example, implicit mapping) or may be explicit (for example, explicit mapping).

Fourth Embodiment

In the first to third embodiments described above, a UE capability as below may be configured. Note that the UE capability as below may be interpreted as a parameter (for example, higher layer parameter) configured for a UE from a network (for example, base station).

UE capability information related to whether to support repetition transmission of a PUSCH (MTRP PUSCH) for a plurality of TRPs may be defined.

UE capability information related to whether to support dynamic changeover between repetition transmission of a PUSCH (MTRP PUSCH) for a plurality of TRPs and repetition transmission of a PUSCH (STRP PUSCH) for a single TRP may be defined.

UE capability information related to whether to support a PUSCH transmission using a specific DCI field (first embodiment) may be defined.

UE capability information related to whether to support a configuration in which codebook-based/non-codebook-based PUSCH repetition transmission is performed for a single TRP/a plurality of TRPs (for example, third embodiment) may be defined.

UE capability information related to whether to support at least one of the first to third embodiments for codebook-based/non-codebook-based PUSCH transmission may be defined.

Note that the embodiments in the present disclosure may be applied to a case under at least one condition of a case where the UE reports to the NW a UE capability corresponding to at least one of the above UE capabilities and a case where at least one UE capability described above is configured/activated/indicated for the UE through higher layer signaling. The embodiments in the present disclosure may be applied to a case where a specific higher layer parameter is configured/activated/indicated for the UE.

According to the fourth embodiment, the UE can implement the function in each embodiment described above while securing compatibility with an existing specification.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 11:
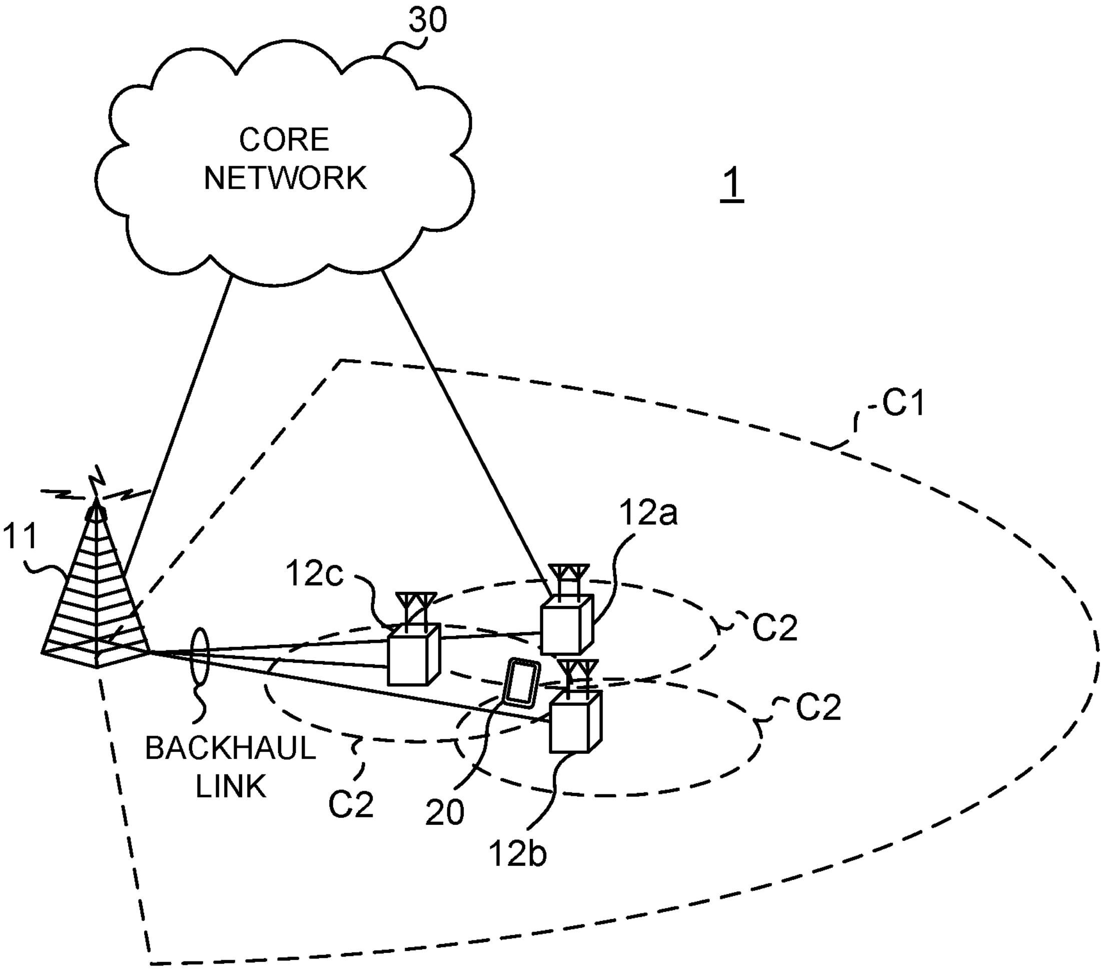
FIG. 11 is a diagram to show an example of a schematic structure of a radio communication system according to one embodiment.

FIG. 11 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12*a* to 12*c*) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHZ), and FR2 may be a frequency band which is higher than 24 GHZ (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 (for example, RRHs) may be connected by a wired connection (for example, optical fiber in compliance with the Common Public Radio Interface (CPRI), the X2 interface, and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data."

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a reference signal for measurement (sounding reference signal (SRS)), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 12:
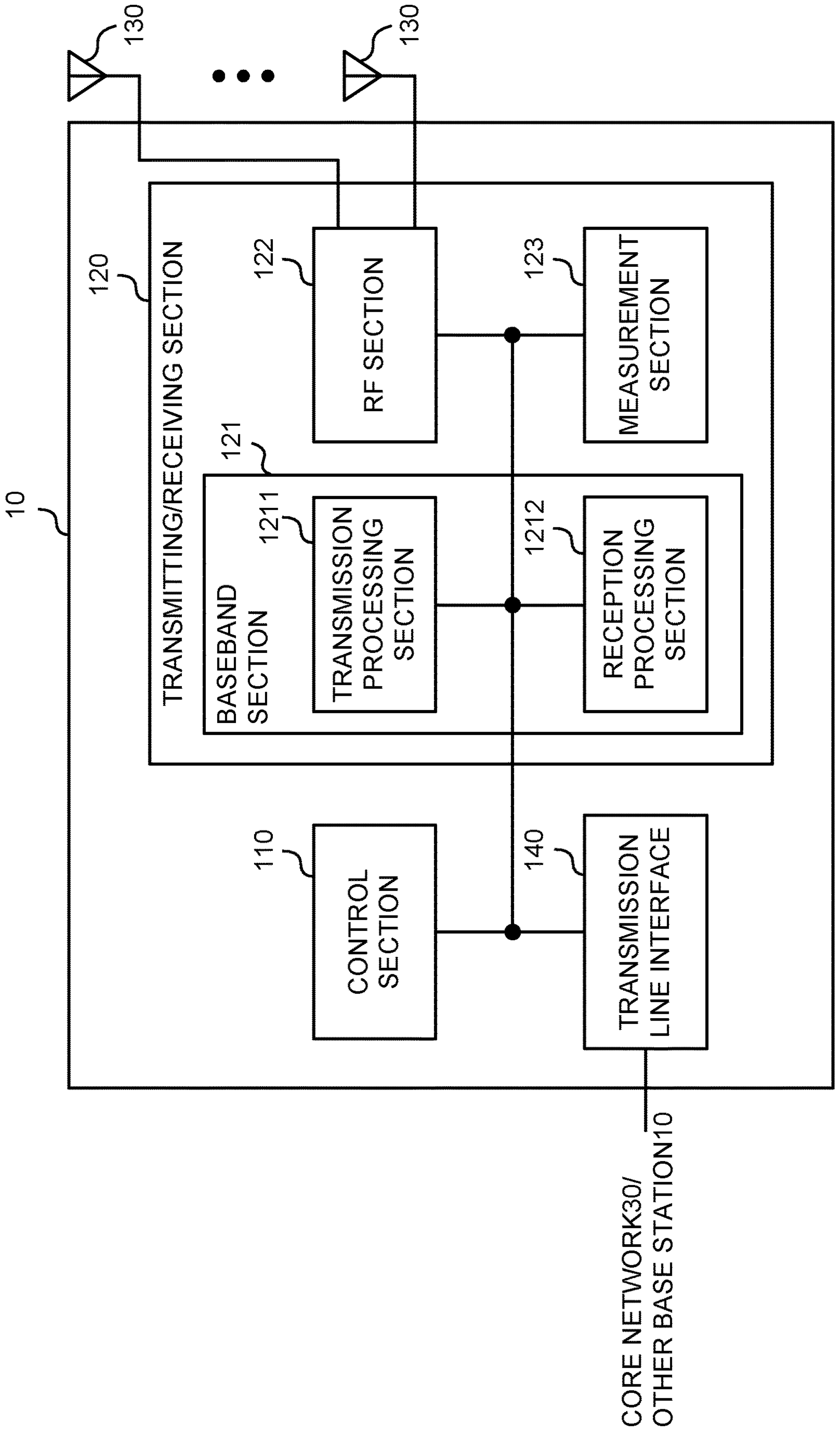
FIG. 12 is a diagram to show an example of a structure of a base station according to one embodiment.

FIG. 12 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

The transmitting/receiving section 120 may transmit, to a terminal, downlink control information including information related to repetition transmission of an uplink shared channel (PUSCH).

The control section 110 may control, by using the downlink control information, notification of the number of transmission/reception points that the terminal performs the repetition transmission of the PUSCH for and a transmission/reception point or a sounding reference signal resource indicator (SRI) corresponding to each of PUSCH transmissions in the repetition transmission of the PUSCH.

(User Terminal)

Figure 13:
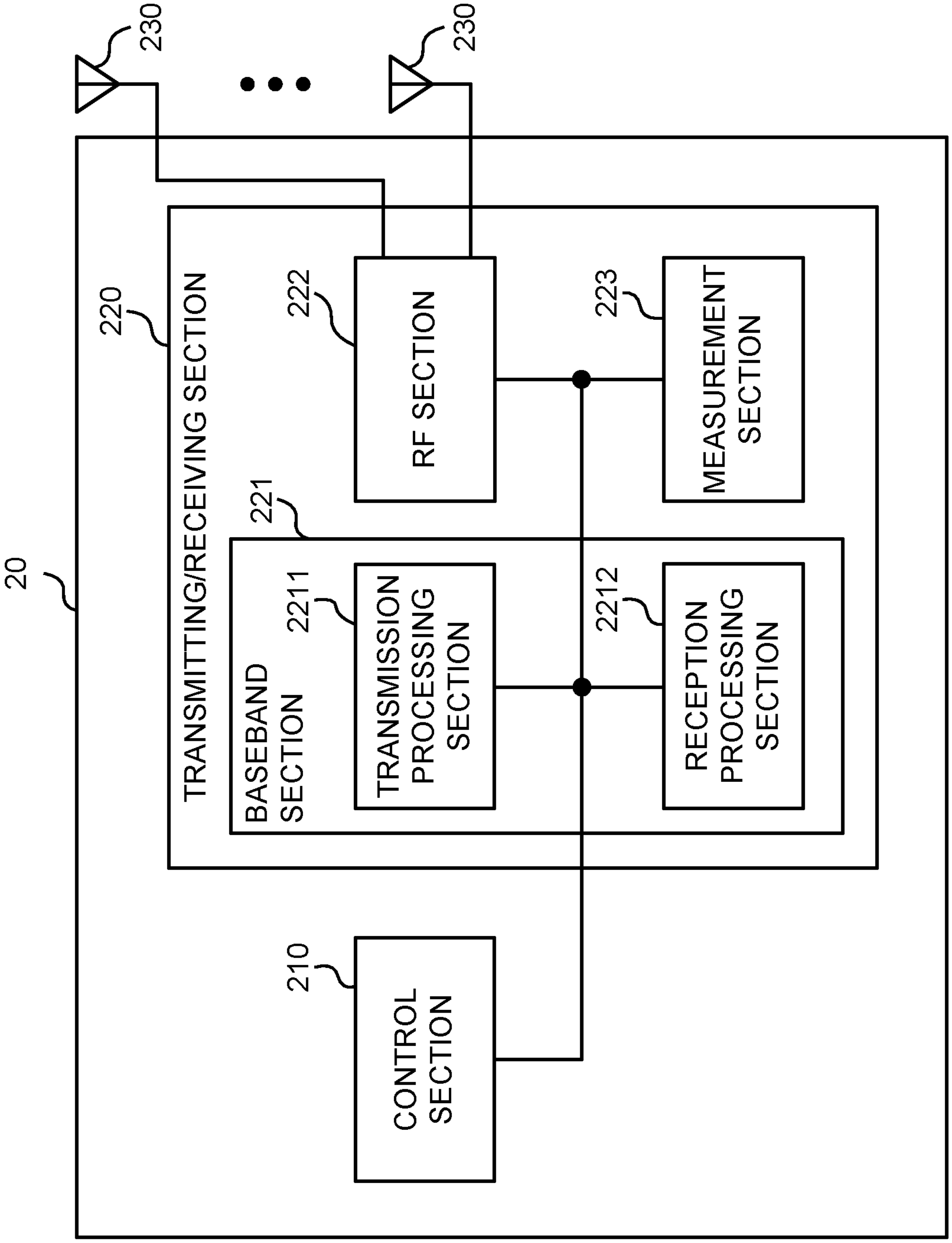
FIG. 13 is a diagram to show an example of a structure of a user terminal according to one embodiment.

FIG. 13 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

The transmitting/receiving section 220 may receive downlink control information (for example, DCI including a specific DCI field) including information related to repetition transmission of an uplink shared channel (PUSCH).

The control section 210 may determine, on the basis of the downlink control information, at least one of the number of transmission/reception points that the repetition transmission of the PUSCH is performed for and a transmission/reception point or a sounding reference signal resource indicator (SRI) corresponding to each of PUSCH transmissions in the repetition transmission of the PUSCH.

A plurality of sounding reference signal resource sets may be configured for the repetition transmission of the PUSCH, and a PUSCH-repetition-transmission index or a control resource set pool index may be associated for each of the plurality of sounding reference signal resource sets.

One sounding reference signal resource set may be configured for the repetition transmission of the PUSCH, and a PUSCH-repetition-transmission index or a control resource set pool index may be associated for each of a plurality of sounding reference signal resources included in a plurality of sounding reference signal resource sets.

Based on whether a codebook is used for the PUSCH and the number of transmission/reception points corresponding to the repetition transmission of the PUSCH, at least one of an SRI field and a sounding reference signal resource to be used may be determined.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 14:
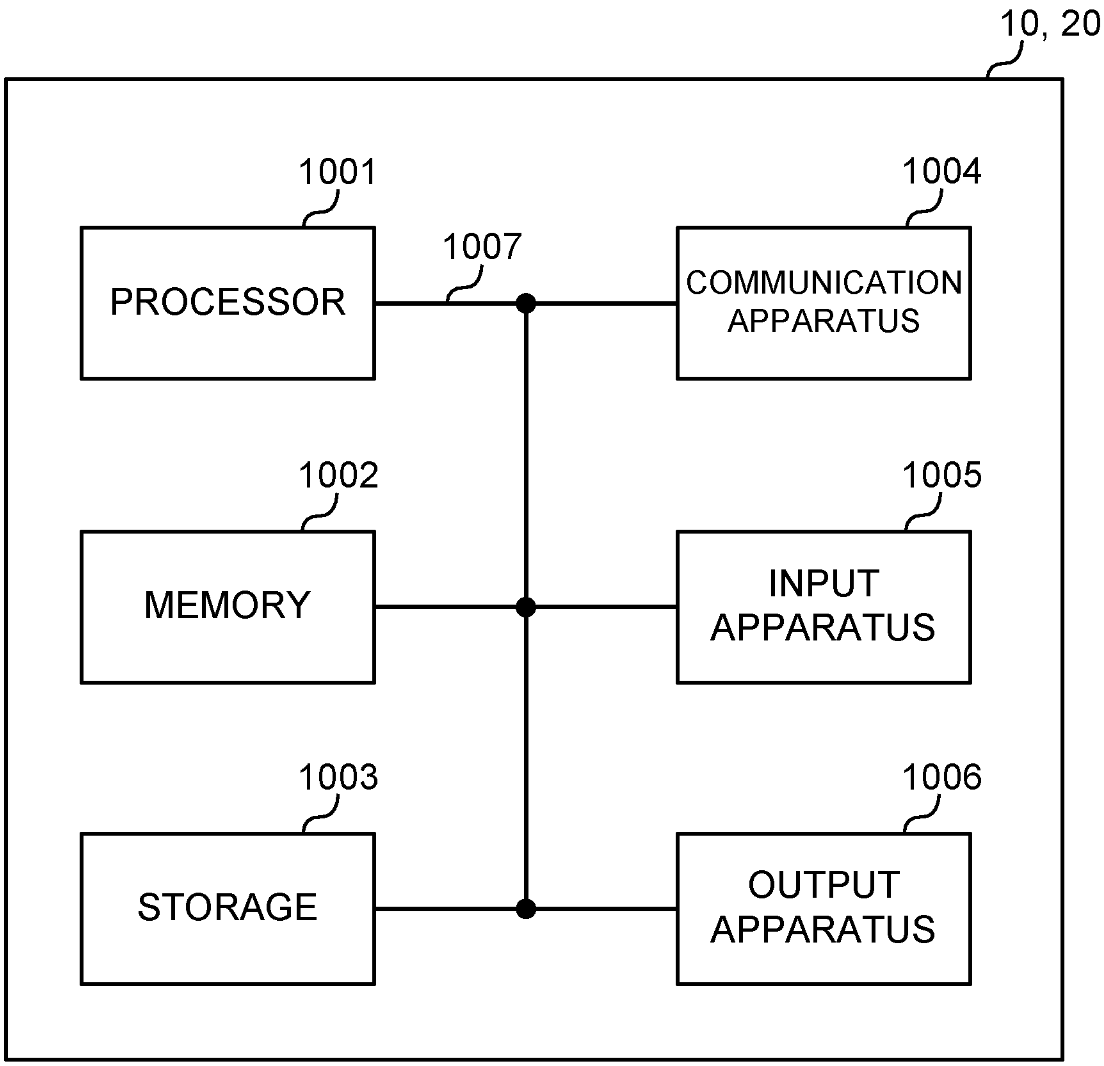
FIG. 14 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 14 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120*a* (220*a*) and the receiving section 120*b* (220*b*) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

Variations

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIS.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "sub-carrier group (SCG)," a "resource element group (REG), "a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a certain signal/channel outside active BWPs. Note that a "cell," a "carrier," and so on in the present disclosure may be interpreted as a "BWP."

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Notification of information is by no means limited to the aspects/embodiments described in the present disclosure, and other methods may be used as well. For example, notification of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be notified using, for example, MAC control elements (MAC CEs).

Also, notification of certain information (for example, notification of "being X") does not necessarily have to be notified explicitly, and can be notified implicitly (by, for example, not notifying this certain information or notifying another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell, "a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a mobile body or a mobile body itself, and so on. The mobile body may be a vehicle (for example, a car, an airplane, and the like), may be a mobile body which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IOT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), 6th generation mobile communication system (6G), xth generation mobile communication system (xG) (xG (where x is, for example, an integer or a decimal)), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

The invention claimed is:

1. A terminal comprising:

a receiver that receives a higher layer parameter configuring a plurality of sounding reference signal resource sets for repetitive transmission of a physical uplink shared channel (PUSCH); and a processor that determines, based on downlink control information, a sounding reference signal resource indicator (SRI) corresponding to each PUSCH transmission in the repetitive transmission of the PUSCH, wherein the repetitive transmission of the PUSCH is associated with each of the plurality of sounding reference signal resource sets, and wherein, when a cyclical or sequential mapping pattern is configured, the processor determines, based on the downlink control information, order of the SRI to apply to the repetitive transmission of the PUSCH.

2. The terminal according to claim 1, wherein, when a plurality of different control resource set pool indices are configured, the control resource set pool indices are associated with the plurality of sounding reference signal resource sets, respectively.

3. A radio communication method for a terminal, comprising:

receiving a higher layer parameter configuring a plurality of sounding reference signal resource sets for repetitive transmission of a physical uplink shared channel (PUSCH); and determining, based on downlink control information, a sounding reference signal resource indicator (SRI) corresponding to each PUSCH transmission in the repetitive transmission of the PUSCH, wherein the repetitive transmission of the PUSCH is associated with each of the plurality of sounding reference signal resource sets, and wherein, when a cyclical or sequential mapping pattern is configured, determining, based on the downlink control information, order of the SRI to apply to the repetitive transmission of the PUSCH.

4. A base station comprising:

a transmitter that transmits, to a terminal, a higher layer parameter configuring a plurality of sounding reference signal resource sets for repetitive transmission of a physical uplink shared channel (PUSCH); and a processor that controls, using downlink control information, a sounding reference signal resource indicator (SRI) corresponding to each PUSCH transmission in the repetitive transmission of the PUSCH, wherein the repetitive transmission of the PUSCH is associated with each of the plurality of sounding reference signal resource sets, and wherein, when a cyclical or sequential mapping pattern is configured, the terminal determines, based on the downlink control information, order of the SRI to apply to the repetitive transmission of the PUSCH.

5. A system comprising a terminal and a base station, wherein the terminal comprises:

a receiver that receives a higher layer parameter configuring a plurality of sounding reference signal resource sets for repetitive transmission of a physical uplink shared channel (PUSCH); and a processor that determines, based on downlink control information, a sounding reference signal resource indicator (SRI) corresponding to each PUSCH transmission in the repetitive transmission of the PUSCH, wherein the repetitive transmission of the PUSCH is associated with each of the plurality of sounding reference signal resource sets, and wherein, when a cyclical or sequential mapping pattern is configured, the processor determines, based on the downlink control information, order of the SRI to apply to the repetitive transmission of the PUSCH, and the base station comprises:

a transmitter that transmits the higher layer parameter to the terminal.

* * * * *